(12) United States Patent
Neuhaus et al.

(10) Patent No.: US 11,415,172 B2
(45) Date of Patent: Aug. 16, 2022

(54) TELESCOPIC RAIL

(71) Applicant: Accuride International GmbH, Diez (DE)

(72) Inventors: Christoph Neuhaus, Niederelbert (DE); Thomas Quirein, Diez (DE)

(73) Assignee: ACCURIDE INTERNATIONAL GMBH, Dietz (DE)

( * ) Notice: Subject to any disclaimer, the term of this patent is extended or adjusted under 35 U.S.C. 154(b) by 198 days.

(21) Appl. No.: 16/769,443

(22) PCT Filed: Dec. 10, 2018

(86) PCT No.: PCT/EP2018/084124
§ 371 (c)(1),
(2) Date: Jun. 3, 2020

(87) PCT Pub. No.: WO2019/115436
PCT Pub. Date: Jun. 20, 2019

(65) Prior Publication Data
US 2020/0370596 A1     Nov. 26, 2020

(30) Foreign Application Priority Data
Dec. 15, 2017 (DE) .......................... 102017130108.9

(51) Int. Cl.
*F16C 29/04* (2006.01)
*F16C 33/38* (2006.01)
(Continued)

(52) U.S. Cl.
CPC .............. *F16C 29/04* (2013.01); *F16C 33/38* (2013.01); *A47B 88/493* (2017.01);
(Continued)

(58) Field of Classification Search
CPC ...... F16C 29/04; F16C 29/045; F16C 29/046; F16C 33/38; A47B 88/473; A47B 88/487; A47B 88/493; A47B 2210/0035
See application file for complete search history.

(56) References Cited

U.S. PATENT DOCUMENTS 3,239,282 A * 3/1966 Schroll ................... F16C 33/40
                                                       384/49
3,801,166 A    4/1974 York
(Continued)

FOREIGN PATENT DOCUMENTS

CN    2781064 Y    5/2006
CN    2911303 Y    6/2007
(Continued)

OTHER PUBLICATIONS

Accuride International GmbH; WO 2019/115436 A1 Published Application with International Search Report dated Jun. 20, 2019; 20 pp.
(Continued)

*Primary Examiner* — Phillip A Johnson
(74) *Attorney, Agent, or Firm* — Snell & Wilmer L.L.P.

(57) ABSTRACT

The invention concerns a telescopic rail comprising a first rail element with two running surfaces, a second rail element with two running surfaces, at least one rolling body cage for positioning a plurality of rolling bodies. Such telescopic rails are found to suffer from the disadvantage that the rail elements and the rolling body cages all have to be designed to be moveable relative to each other. Accordingly, the invention proposes providing a telescopic rail in which the rolling body cage is secured to the first rail element so that the rolling bodies perform a sliding movement with respect to the running surfaces of the first rail element and the rolling bodies perform a sliding movement with respect to (Continued)

Figure 1:
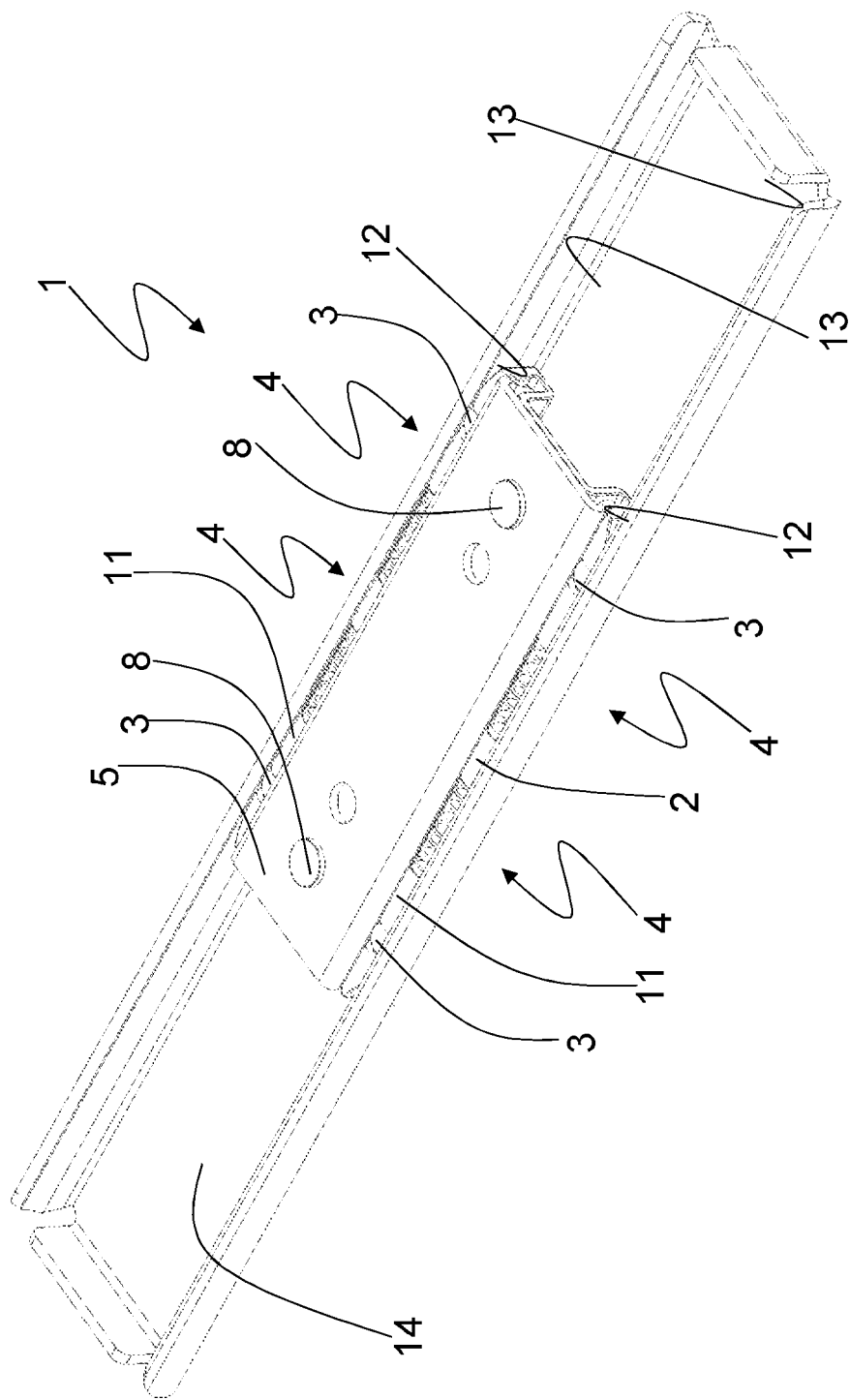

the running surfaces of the second rail element or roll on the running surfaces of the second rail element.

14 Claims, 3 Drawing Sheets

(51) Int. Cl.
  *A47B 88/493* (2017.01)
  *F16C 33/32* (2006.01)
(52) U.S. Cl.
  CPC ....... *A47B 2210/0035* (2013.01); *F16C 33/32* (2013.01); *F16C 2202/52* (2013.01)

(56) References Cited

U.S. PATENT DOCUMENTS

| | | | |
|---|---|---|---|
| 4,943,169 | A | 7/1990 | Kasai |
| 2004/0047678 | A1 | 3/2004 | Lauchner |
| 2011/0194791 | A1* | 8/2011 | Jahrling ............... F16C 33/40 29/898.1 |
| 2012/0199719 | A1 | 8/2012 | Yamada et al. |
| 2019/0001842 | A1* | 1/2019 | Quast ................ B60N 2/0715 |

FOREIGN PATENT DOCUMENTS

| | | |
|---|---|---|
| CN | 1993068 A | 7/2007 |
| CN | 202541354 U | 11/2012 |
| CN | 205383182 U | 7/2016 |
| CN | 205592279 U | 9/2016 |
| CN | 205780303 U | 12/2016 |
| CN | 106523525 A | 3/2017 |
| CN | 206449110 U | 8/2017 |
| DE | 3716923 A1 | 5/1987 |
| DE | 202006001559 U1 | 5/2006 |
| DE | WO-2006136481 A1 * | 12/2006 |
| DE | 1873460 A2 * | 1/2008 |
| DE | 102008053504 A1 * | 4/2010 |
| DE | 102009014894 A1 | 9/2010 |
| DE | 202011051895 U1 | 1/2012 |
| DE | 102011006745 A1 | 10/2012 |
| DE | 202011110428 U1 | 2/2014 |
| EP | 1571357 A1 | 9/2005 |
| EP | 1834107 A1 | 9/2007 |
| EP | 2481990 A1 | 8/2012 |
| GB | WO-2012025717 A2 * | 3/2012 |
| JP | 2009299890 A | 12/2009 |
| WO | 2006027435 A1 | 3/2006 |

OTHER PUBLICATIONS

International Search Report in the German language for PCT/EP2018/084124 dated Apr. 16, 2019; 10 pp.
German Search Report in the German language for German Application No. 10 2017 130 108.9 dated Oct. 2, 2018; 8 pp.
Chinese Office Action, for Application No. 201880080109.7, dated Apr. 6, 2021 (along with English translation).

* cited by examiner

TELESCOPIC RAIL

CROSS-REFERENCE TO RELATED APPLICATIONS

This application is a national stage entry of International Patent Application No. PCT/EP2018/084124, filed Dec. 10, 2018, entitled "TELESCOPIC RAIL," which claims priority to German Patent Application Serial No. 102017130108.9, filed Dec. 15, 2017, entitled "TELESCOPIC RAIL," the disclosures of which are hereby incorporated by reference in their entirety.

The present invention concerns a telescopic rail comprising a first rail element with two running surfaces, a second rail element with two running surfaces, at least one rolling body cage for positioning a plurality of rolling bodies, and a plurality of rolling bodies which are received at the rolling body cage, wherein portions of the rolling body cage with the rolling bodies are arranged between the running surfaces of the first and second rail elements in such a way that the first rail element and the second rail element are linearly displaceable relative to each other in an extension direction, wherein the rolling body cage establishes a position of each rolling body in the extension direction relative to the rolling body cage.

Telescopic rails having a first rail element, a second rail element and a rolling body cage with rolling bodies accommodated therein between the running surfaces of the first rail element and the running surfaces of the second rail element are known from the state of the art. They are used in different domestic appliances but also in automobile engineering and many other applications.

To permit a telescopic rail to be pulled out and pushed in with as little friction as possible, that is to say a sliding movement between the first and second rail elements, many configurations of telescopic rails in the state of the art have rolling bodies arranged between two respective rail elements, wherein the rolling bodies roll on the surfaces of the rail elements upon relative movement of the rail elements with respect to each other. The rolling friction which occurs in that case is less than a direct sliding friction between the rail elements without rolling bodies. Due to the rolling movement of the rolling bodies on the running surfaces of the two rail elements rotation of the rolling body in the extension direction leads to a displacement travel of the two rail elements relative to each other, the length of which is equal to double the periphery of the rolling body in the extension direction.

To ensure uniform distribution of the rolling bodies between two mutually moveable rail elements the rolling bodies are typically guided is so-called rolling body cages. In that arrangement a rolling body cage guarantees a defined spacing of the rolling bodies from each other in the extension direction. It will be noted however that the above-described rolling movement of the rolling bodies simultaneously on the running surfaces of the two machine elements requires a ball cage which is moveable with respect to both machine elements.

It has been found that the state of the art suffers from the disadvantage that the conventional rail elements and rolling body cages all have to be designed to be moveable relative to each other. That considerably increases the demands in terms of construction on the individual elements of the telescopic rail.

There is therefore a need for a telescopic rail which avoids the disadvantages of the telescopic rails in the state of the art.

To attain that object according to the invention there is proposed a telescopic rail of the kind set forth in the opening part of this specification, wherein the rolling body cage is secured to the first rail element so that the rolling bodies perform a sliding movement with respect to the running surfaces of the first rail element and the rolling bodies perform a sliding movement with respect to the running surfaces of the second rail element or roll on the running surfaces of the second rail element.

The fact of the rolling body cage being secured to the first rail element in accordance with the invention provides that the rolling bodies perform a sliding movement with respect to the running surfaces of the first rail element. Depending on how high the friction is between the rolling bodies and the rolling body cage and between the rolling bodies and the running surfaces of the first rail element the rolling bodies perform a sliding movement with respect to the running surfaces of the second rail element or roll on the running surfaces of the second rail element. A rolling movement on the second rail element has the advantage that such movement reduces the total friction in the displacement movement of the two rail elements relative to each other.

It is surprising that, although securing the rolling body cage results in a sliding movement of the rolling bodies at least with respect to the running surfaces of the first rail element, it nonetheless causes a reduction in the total friction in the displacement movement.

Securing the rolling body cage to the first rail element has the result that the structural demands on the two rail elements and the rolling body cage are reduced as it is not necessary to ensure a relative movement of the rolling body cage with respect to both rail elements at the same time.

When in the present application reference is made to a telescopic rail that term is to be interpreted generally such that it not only encompasses rails in which the first rail element and the second rail element are of approximately the same length, but also linear guides in which the first rail element is markedly shorter than the second rail element.

When the present application makes reference to the fact that the telescopic rail has a first rail element and a second rail element this does not exclude the telescopic rail including further rail elements, in particular to provide for complete telescopic extension.

The term rolling body in accordance with the present application is used to denote a rotational body which as an element of a guide considerably reduces the friction between the various rail elements and thus facilitates a relative movement of the two rails with respect to each other. Rolling bodies are for example balls, rollers, barrel rolls, needles or cones.

In an embodiment of the present invention the rolling bodies are balls. It will be appreciated that in that case the rolling body cage is a ball cage.

In an embodiment of the invention the rolling body cage has at least two receiving limbs with through openings for the rolling bodies. The rolling bodies themselves are then mounted on the rolling body cage in the through openings in the receiving limbs.

In a further embodiment the rolling body cage has at least one connecting portion connecting the two receiving limbs. In an embodiment the connecting portion substantially determines the width of the rolling body cage.

It will be appreciated that the receiving limbs of the rolling body cage extend as portions of the rolling body cage between the running surfaces of the first and second rail elements.

In an embodiment of the invention the rolling body cage is made from a material selected from a group consisting of aluminium sheet, steel sheet, stainless steel or plastic.

A plastic has proven to be particularly suitable as, when using rolling bodies of a metal, for example steel, a rolling body cage of plastic reduces the friction between the rolling bodies and the rolling body cage.

In an embodiment of the invention the rolling body cage includes a lubricant, wherein the lubricant is arranged in particular in the region of an engagement between at least one of the rolling bodies and the rolling body cage so that the rolling body transfers the lubricant on to the running surfaces of the two rail elements.

In a further embodiment at least one of the rolling bodies is made from graphite or has a coating of graphite or graphite introduced into the material of the rolling body.

It has been found that it is possible to provide rolling bodies of graphite which quite similarly to rolling bodies of hard materials like for example steel run guided by the rolling body cage between two rail elements and in so doing experience a certain removal of material which as graphite lubrication on the running surfaces of the rail elements lubricates the running movement of the harder rolling bodies between the rail elements.

The lubrication which is performed in that way is found to be highly long-lasting if at least one rolling body is made completely from graphite and removal of the graphite material occurs only in comparatively small amounts.

The fact that the rolling body cage is secured to the first rail element permits implementation of the rolling body cage with further functions.

Therefore in an embodiment of the invention arranged between at least one of the running surfaces of the first rail element and at least one of the running surfaces of the second rail element is a brake body which is secured to the rolling body cage and which upon an extension movement of the first rail element with respect to the second rail element performs a sliding movement on the running surface of the second rail element.

In an embodiment of the invention the brake body is prestressed resiliently against the running surface of the second rail element. The braking action of the brake body then depends inter alia on the resilient prestressing. In an embodiment the resilient prestressing is in a direction perpendicular to the extension direction.

In an embodiment of the invention the brake body is in one piece with the rolling body cage, with the brake body being of a resiliently bendable structure. In such an embodiment the resilient prestressing of the brake body against the running surface of the second rail element can already be provided by the material of the rolling body cage and the brake body itself. This does not exclude a spring element additionally also being provided between the brake body and the first rail element, preferably however between the brake body and the rolling body cage, which provides for additional resilient prestressing of the brake body against the running surface of the second rail element.

In an embodiment the brake body is adapted to be resiliently bendable in a direction perpendicular to the extension direction.

In an embodiment of the invention the brake body is of an internal cross-section in the form of part of a circular arc in a direction perpendicular to the extension direction. In this embodiment the brake body is substantially formed by a peripheral portion of a hollow cylinder, wherein the peripheral portions is connected, preferably integrally, to the material of the rolling body cage.

In an embodiment of the invention arranged in the internal cross-section of the brake body is a spring element which prestresses the brake body resiliently in the direction of the running surface of the second rail element.

Such a spring element can be for example an elastic polymer body.

In an embodiment however the spring element is a coil spring. In a further embodiment the coil spring has a longitudinal axis wherein the longitudinal axis extends substantially parallel to the extension direction. In such an embodiment the resilient action of the coil spring is used in the radial direction and not the axial direction.

In an embodiment of the invention the rolling body cage for securing to the first rail element has a projection engaging into an opening in the first rail element. The reversed arrangement in which the projection is provided on the first rail element and the opening is provided on the rolling body cage is also conceivable.

In a further embodiment the first rail element is an inner rail element and the second rail element is an outer rail. In that case in accordance with the present application the term outer rail is used to denote the rail element, the running surfaces of which face towards each other while the term inner rail denotes the rail element whose running surfaces face away from each other.

Further features, advantages and possible uses of the telescopic rail according to the invention will be apparent from the following description of an embodiment thereof and the accompanying Figures.

Figure 2:
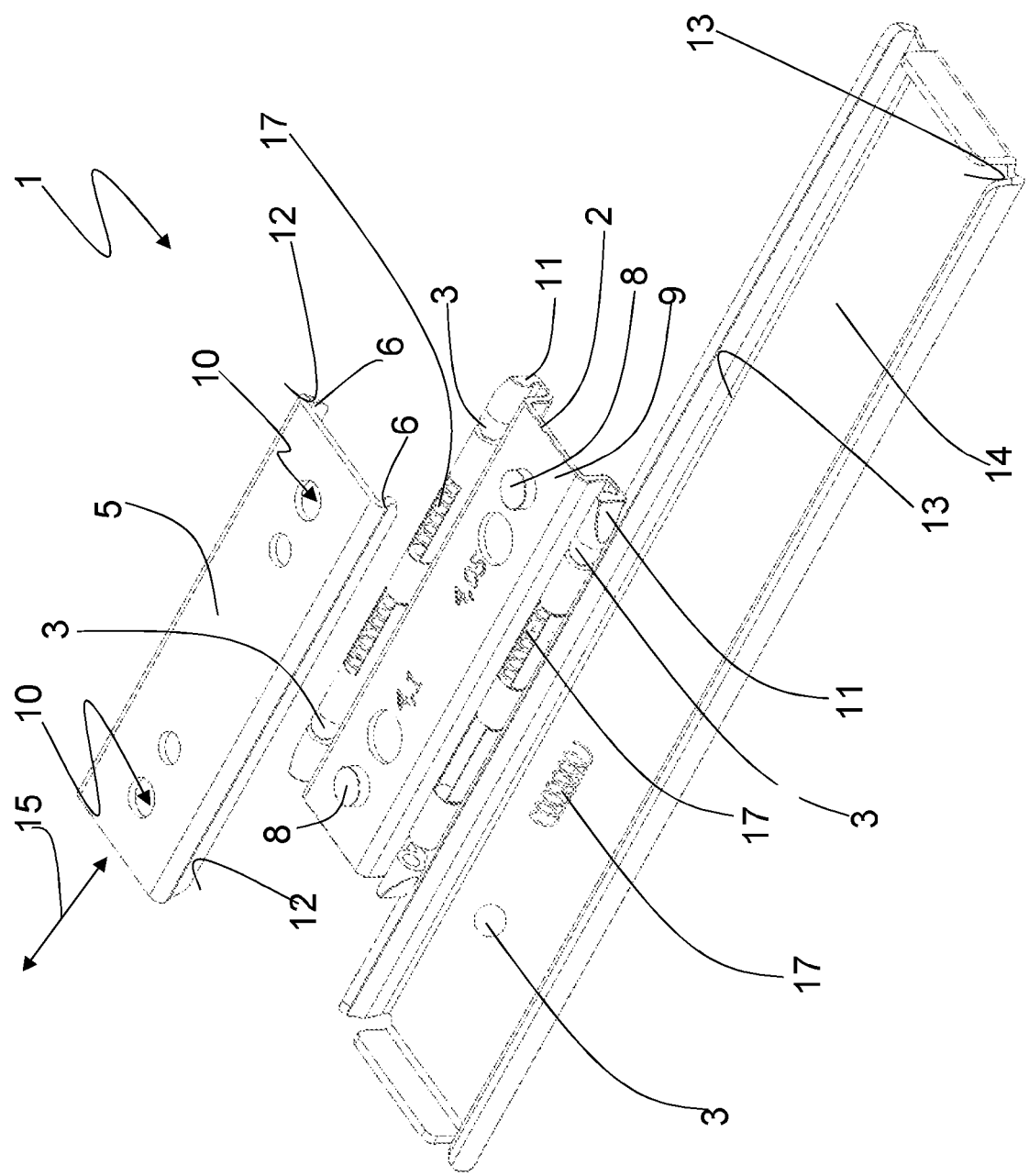
Figure 3:
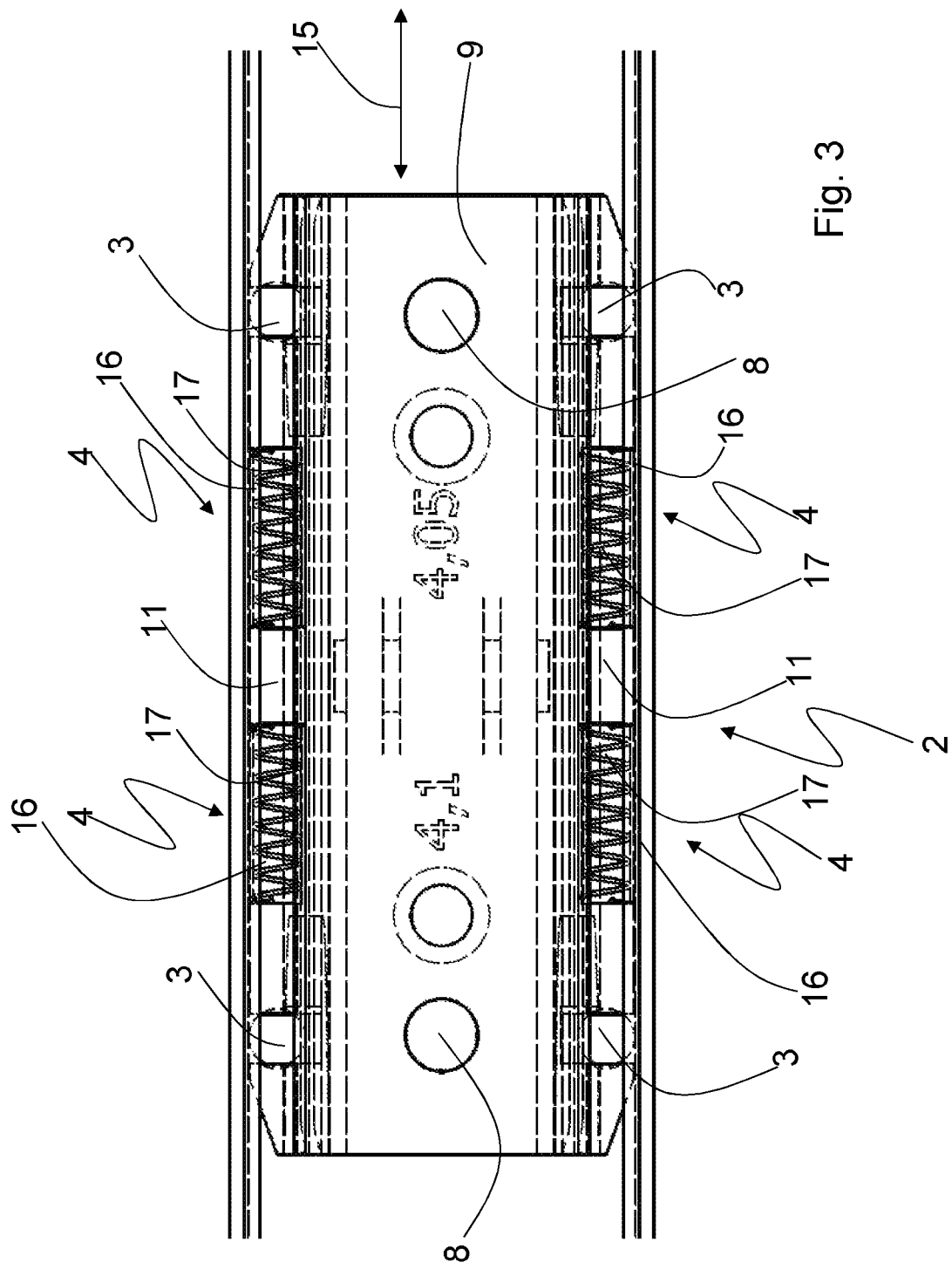

FIG. 1 shows a perspective partially transparent and broken-away view of a telescopic rail according to an embodiment of the present invention, FIG. 2 shows a broken-away exploded view of the telescopic rail of FIG. 1, and FIG. 3 shows a plan view of the ball cage of the telescopic rail of FIGS. 1 and 2.

In the Figures identical elements are denoted by identical references.

FIGS. 1 and 2 show an embodiment of the telescopic rail 1 according to the invention, in which the ball cage 2, besides guiding the rolling bodies in the form of balls 3, also provides four brake elements 4. FIG. 3 shows the ball cage 2 of the telescopic rail 1 of FIGS. 1 and 2.

In the illustrated embodiment the ball cage 2 is secured to the inner rail 5. Accordingly the inner rail 5 forms the first rail element in accordance with the present application. It can be seen from the exploded view in FIG. 2 that the ball cage 2 is clipped into the inner rail 5 so that it extends between the limbs 6 of the inner rail 5, that carry the running surfaces 12 of the inner rail 5. To prevent displacement of the ball cage 2 with respect to the inner rail 5 the ball cage 2 at its connecting portion 9 has two projections 8 engaging into openings 10 in the inner rail 5, that are complementary to the projections 8.

The illustrated ball cage 2 is produced in the form of an injection moulding from plastic and thus involves a comparatively low level of friction between the ball cage 2 and the balls 3 accommodated in its through openings.

The ball cage 2 includes a connecting portion 9 connecting the receiving limbs 11 of the ball cage 2. in the installed state shown in FIG. 1 the receiving limbs 11 then extend between the running surfaces 12, 13 of the inner rail 5 and the outer rail 14.

By virtue of the ball cage 2 being secured to the inner rail 5 in the extension direction the balls 3 perform a sliding or frictional movement upon extension or relative displacement of the two rail elements 5, 14 at least with respect to the running surfaces 12 of the inner rail 5.

As in the illustrated embodiment the friction of the balls 3 against the receiving limbs 11 of the ball cage 2 is comparatively low the balls roll on the running surfaces 13 of the outer rail 14. Even if however the rolling movement of the balls 3 on the running surfaces 13 of the outer rail 14 were at least partially replaced by a sliding movement the ball cage 2 of the telescopic rail 1 according to the invention would nonetheless ensure a satisfactory reduction in the friction between the two rail elements 5, 14 during an extension movement.

The structure of the brake elements 4 can be clearly seen in the plan view of FIG. 3. The brake elements 4 each include a respective brake body 16 which in the mounted state is in frictional engagement with and slides on a running surface 13 of the outer rail 14. The brake body 16 is integrally injection moulded on the rolling body cage 2, more precisely the receiving limbs 11 thereof. In that arrangement the brake body 16 is formed by a resiliently bendable material portion.

The resiliently bendable material portion is of a part-circular internal cross-section in a plane perpendicular to the extension direction 15. To support the resilient action and prestressing of the brake body 16 which is already provided by the initial material itself a coil spring 17 is disposed in the interior of the cross-sectional profile of the brake body 16.

In that arrangement the coil spring 17 extends with its longitudinal axis substantially parallel to the extension direction 15. The spring action of the coil spring 17 is utilised in the radial direction and not as is otherwise usual with coil springs in an axial direction. In that way it is possible to set a very clearly defined braking action on the part of the brake body 16 by the choice of a coil spring of suitable radius.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES 1 telescopic rail
2 ball cage
3 balls
4 brake elements
5 inner rail
6 limbs
8 projections
9 connecting portion
10 openings
11 receiving limbs
12, 13 running surface
14 outer rail
15 extension direction
16 brake body
17 coil spring

The invention claimed is:
1. A telescopic rail comprising:
a first rail element with two running surfaces,
a second rail element with two running surfaces,
at least one rolling body cage, and
a plurality of rolling bodies positioned by and received at the rolling body cage,
wherein portions of the rolling body cage with the rolling bodies are arranged between the running surfaces of the first and second rail elements in such a way that the first rail element and the second rail element are linearly displaceable relative to each other in an extension direction,
wherein the rolling body cage establishes a position of each rolling body in the extension direction relative to the rolling body cage, and
wherein the rolling body cage is secured to the first rail element so that the rolling bodies perform a sliding movement with respect to the running surfaces of the first rail element and the rolling bodies perform a sliding movement with respect to the running surfaces of the second rail element or roll on the running surfaces of the second rail element.

2. The telescopic rail according to claim 1, wherein the rolling body cage includes a plastic.

3. The telescopic rail according to claim 1, wherein the rolling body cage includes a lubricant.

4. The telescopic rail according to claim 1, wherein at least one of the rolling bodies has graphite or at least one of the rolling bodies is made from graphite.

5. The telescopic rail according to claim 1, wherein arranged between at least one of the running surfaces of the first rail element and at least one of the running surfaces of the second rail element is a brake body which is secured to the rolling body cage and which upon an extension movement of the first rail element with respect to the second rail element performs a sliding movement on the at least one of the running surfaces of the second rail element.

6. The telescopic rail according to claim 5, wherein the brake body is resiliently prestressed against one of the two running surfaces of the second rail element.

7. A The telescopic rail according to claim 5, wherein the brake body is in one piece with the rolling body cage, the brake body being of a resiliently bendable nature.

8. The telescopic rail according to claim 5, wherein in a direction perpendicular to the extension direction the brake body has an internal cross-section in the form of part of a circular arc.

9. The telescopic rail according to claim 8, wherein arranged between the first rail element and the brake body is a spring element which prestresses the brake body in the direction of one of the two running surfaces of the second rail element.

10. The telescopic rail according to claim 9, wherein the spring element is a coil spring having a longitudinal axis, the longitudinal axis extending substantially in the extension direction.

11. The telescopic rail according to claim 1, wherein the rolling body cage has a projection engaging into an opening in the first rail element.

12. The telescopic rail according to claim 1, wherein the first rail element is an inner rail and the second rail element is an outer rail.

13. The telescopic rail according to claim 1, wherein the rolling bodies are balls.

14. A telescopic rail comprising:
- a first rail element with two running surfaces,
- a second rail element with two running surfaces,
- at least one rolling body cage, and
- a plurality of rolling bodies positioned by and received at the rolling body cage, wherein portions of the rolling body cage with the rolling bodies are arranged between the running surfaces of the first and second rail element in such a way that the first rail element and the second rail element are linearly displaceable relative to each other in an extension direction,
- wherein the rolling body cage establishes a position of each rolling body in the extension direction relative to the rolling body cage,
- wherein the rolling body cage is secured to the first rail element so that the rolling bodies perform a sliding movement with respect to the running surfaces of the first rail element and the rolling bodies roll on the running surfaces of the second rail element.

\* \* \* \* \*